June 9, 1959

J. L. WEININGER 2,890,259

THERMOCELL

Filed April 9, 1957

Inventor:
Joseph L. Weininger,
by Paul A. Frank
His Attorney.

2,890,259
THERMOCELL

Joseph L. Weininger, Scotia, N.Y., assignor to General Electric Company, a corporation of New York Application April 9, 1957, Serial No. 651,758

3 Claims. (Cl. 136—4)

This invention relates to improved thermocells. More particularly, this invention relates to thermocells having long life, operable at elevated temperatures and having gaseous electrodes.

A thermocell or non-isothermal voltaic cell is a device for converting heat energy into electrical energy by an electrochemical reaction. In a thermocell, two identical electrodes are provided which are separated by an electrolyte. The two electrodes are maintained at different temperatures and the temperature differential between the two electrodes generates an electrical potential between the two electrodes. In the usual operation of thermocells, the overall cell reaction results in the transport of electrode material from one electrode to the other. This transport of electrode material from one electrode to the other limits the useful life of present thermocells since the cells cease to operate as soon as all of the material from one of the electrodes is depleted.

An object of the present invention is to provide an improved thermocell in which there is no depletion of the material of one electrode.

A further object of the present invention is to provide a high temperature thermocell useful for the conversion of thermal energy, e.g. waste heat, into electrical energy.

These and other objects of my invention are accomplished by providing a thermocell comprising a crystalline silver iodide electrolyte and two iodine electrodes with means for returning the iodine from the electrode at which it is formed to the electrode at which it is consumed.

My invention may be best understood by reference to the following detailed description taken in connection with the drawing, in which.

Figure 1:
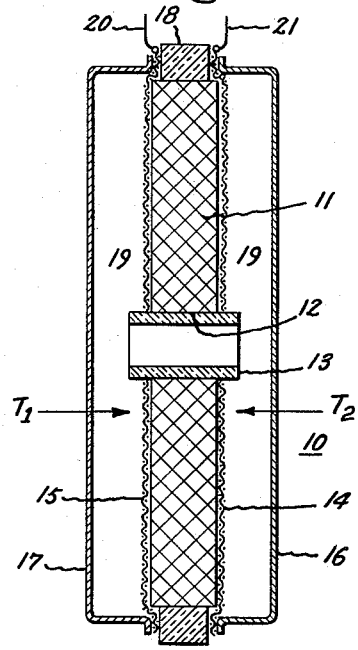
Fig. 1 is a sectional view of a thermocell of the present invention.

Fig. 1 shows a cell 10 of the present invention which comprises a solid silver iodide electrolyte 11 which is in the form of a flat annular ring having an aperture 12 in the axis thereof. In this aperture is located a hollow cylindrical insulating member 13 which may be formed of any suitable imperforate ceramic material, e.g., glazed alumina. A pair of inert metal electrodes 14 and 15 are placed on either side of and in contact with silver iodide electrolyte 11. Electrodes 14 and 15 are formed of foraminate material, such as wire mesh or screen, perforated metal, expanded metal, sputtered metal, or metal deposited from a colloidal solution. These electrodes are generally annular in shape with their central aperture designed to fit around the periphery of member 13. This entire assembly is sealed in a suitable housing comprising members 16 and 17 with a gasket 18 between members 16 and 17 of the housing.

Gasket 18 may be formed of an imperforate ceramic material or any other imperforate material which is stable at temperatures to about 550° C. The housing may be formed of any material which is not corroded by iodine. Suitable materials are metals such as tantalum, platinum, nickel, etc. In addition, housing members 16 and 17 may also be formed of any suitable ceramic material. However, for ease of heat transfer it is preferred to have members 16 and 17 formed of a metal. When members 16 and 17 are metallic, they may be soldered to electrodes 14 and 15 adjacent gasket 18. The function of gasket 18 is to make the entire assembly gas tight, to prevent electrical contact between housing members 16 and 17, and to provide a means of anchoring electrodes 14 and 15 so as to maintain electrodes 14 and 15 in contact with electrolyte 11.

As is shown in the drawing, gasket 18 is thinner than electrolyte 11 so that when the electrodes 14 and 15 are cemented to gasket 18, they will be held in contact with electrolyte 11. The inner periphery of gasket 18 is in contact with the outer periphery of silver iodide electrolyte 11 so as to prevent communication from one side of electrolyte 11 to the other at this point. The free area 19 within the cell 10 is filled with iodine, which serves as the electrodes of the cell. Suitable leads 20 and 21 can be provided to connect inert electrodes 14 and 15 to any load (not shown).

Electrodes 14 and 15 do not take part in the cell reaction but are provided to serve as sites for the electrode reactions between the iodine electrodes and the electrolyte 11. Another function of inert electrodes 14 and 15 is to provide heat transfer to and from the cell so that the interfaces between electrolyte 11 and iodine 19 may be at the desired temperature. Suitable materials for electrodes 14 and 15 include metals which are not corroded by silver iodide or iodine. Suitable metals include, for example, tantalum, platinum, nickel, etc.

The pressure of iodine 19 in cell 10 may vary within extremely wide limits. Thus, suitable iodine pressures are on the order of from about fractions of a millimeter to about 1500 mm.

In the construction of the cells of the present invention, molten silver iodide at a temperature above its melting point of 552° C. is cast into a flat annular plate around a hollow cylindrical ceramic member 13. After cooling of this subassembly, gasket 18 is placed around the periphery of the silver iodide electrolyte 11 and electrodes 14 and 15 are pressed against the electrolyte and cemented to gasket 18 by means of a suitable cement, such as a potassium silicate cement. Metal housing members 16 and 17 are then soldered to electrodes 14 and 15. Since members 16 and 17 are in contact with electrodes 14 and 15, respectively, members 16 and 17 serve as poles of thermocell 10 when these members are metal. In this case leads 20 and 21 are unnecessary.

The iodine may be placed in cell 10 by any suitable means. The most satisfactory method of incorporating the iodine into the cell structure is to place iodine crystals in the cell prior to final assembly of the cell.

In the operation of the cell, a temperature differential must be maintained between inert electrode 14 and inert electrode 15 so as to generate an electromotive force between the two electrodes. It has been found that the cell 10 is most efficient when the cooler of electrodes 14 and 15 is at a temperature of at least 145° C. The temperature of the warmer electrode may then vary up to about 550° C. Thus, the maximum efficient temperature differential between electrodes 13 and 14 is about 405° C. In the operation of the cell of the present invention in the temperature range described, it is found that the electromotive force between the two electrodes is 0.56 millivolt per degree centigrade. Thus, with one of the inert electrodes at a temperature of 200° C. and the other of the electrodes at 300° C., the electromotive force of the cell is 56 millivolts.

The operating range of the cell of the present invention is based on the fact that silver iodide exists in its alpha form at a temperature of from about 145 to about 550° C. In this alpha form the resistivity of silver iodide is extremely low so that high currents are possible from the cells of the present invention.

The chemical reaction involved in the cells of the present invention results in the transport of iodine from the hot electrode to the cold electrode of cell 10. Specifically, at the high temperature electrode, or cathode, iodine plus electrons form iodide ions. In Fig. 1 the high temperature electrode or cathode is indicated as electrode 14 which is maintained at temperature $T_2$. At the cold electrode, or anode, iodide ions are converted to iodine with the release of electrons. In Fig. 1 the cold electrode or anode is indicated as electrode 15 which is maintained at a temperature of $T_1$. Temperature $T_1$, of course, is lower than temperature $T_2$. Since iodine is used up at the cathode and given off at the anode, the pressure of the iodine adjacent the cathode tends to fall while the pressure adjacent the anode begins to rise. The cylindrical member 13 of cell 10 is provided so that iodine can travel from the high pressure region adjacent the anode to the low pressure region adjacent the cathode and thus maintain a uniform iodine pressure on both sides of electrolyte 11 and in effect replenish the iodine from the cathode as it is used. Thus, the cell of the present invention is operable for an indefinite period of time since the consumed electrode is constantly replenished in use. This is in contrast to prior art thermocells where no method is provided to replenish the electrode which is consumed.

In Fig. 1 the member 13 for returning iodine from the anode to the cathode is shown as a hollow tube. This member may also consist of a porous ceramic cylinder so that iodine may diffuse through the porous cylinder while at the same time the cylinder provides a baffle against rapid mass and heat transfer. With this porous construction it is easier to maintain electrodes 14 and 15 at the desired temperature differential. In a further modification of the cell of the present invention, member 13 may be eliminated entirely, so long as the aperture 12 is left in electrolyte 11 to allow return of iodine from the anode to the cathode.

At a given temperature difference between electrodes, the current obtainable from a cell of the present invention varies with the internal resistance of the cell, which in turn varies inversely with the cross-sectional area of contact between electrolyte 11 and the iodine electrodes, and directly with the thickness of electrolyte 11. As with all gas electrodes, the current also varies logarithmically with iodine pressure, the higher the pressure the higher the current for a given structure.

For a cell having the configuration of cell 10 with the surface area of the electrolyte 11 on each side of the cell being 10 square centimeters, with an electrolyte thickness of 0.1 centimeter, with iodine electrodes at one atmosphere, with electrodes 14 and 15 and housing members 16 and 17 formed of tantalum screen and tantalum metal, respectively, with electrode 14 at a temperature of 550° C. and electrode 15 at a temperature of 350° C., an open circuit voltage of 112 millivolts is obtained with a short circuit current of 27 amps.

Figure 2:
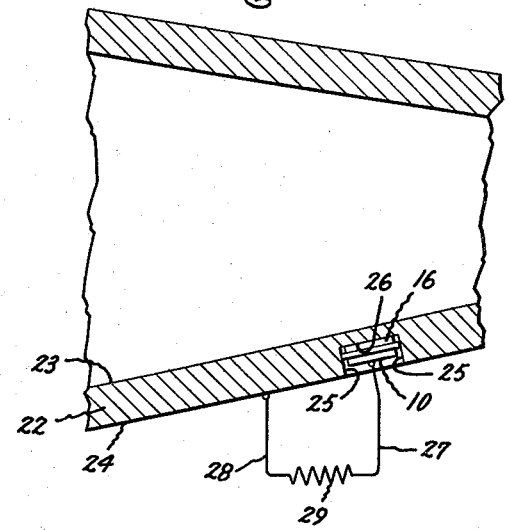
Fig. 2 is a view showing the application of this thermocell in the conversion of waste heat into electrical energy.

Fig. 2 illustrates the application of the cells of the present invention for the conversion of waste heat to electrical energy. In Fig. 2 is shown the recovery of waste heat from the exhaust cone of a jet engine. This exhaust cone comprises a generally tapered member having a wall 22 of substantial thickness through which combustion gases pass to the atmosphere. Wall 22 has an inner surface 23 and an outer surface 24. Wall 22 contains a recess defined by side walls 25 and inner wall 26. A cell 10 of the present invention is placed in the recess defined by walls 25 and 26 with housing member 16 in contact with wall 26. Since there is a temperature gradient between inner surface 23 and outer surface 24 of wall 22, cell 10 is positioned within the recess defined by walls 25 and 26 in such a location that the temperature gradient from one side of cell 10 to the other side of the cell acts as the temperature gradient across the cell electrodes. Since housing member 16 is in electrical contact with wall 26, the entire wall 22 of the exhaust cone is at the electrical potential of one of the cell electrodes. A suitable lead 27 is connected to the other pole of cell 10, and by means of lead 28 connected to wall 22 the output of cell 10 is placed across any desired load 29.

Although the cells of the present invention have been described primarily in terms of circular or annular members, it should be understood that the shape of the cell is unimportant for purposes of the present invention. All that is required is that the cell contains a silver iodide electrolyte with iodine electrodes adapted to operate at different temperatures and with means for returning iodine from the side of the cell at which it is formed to the side of the cell at which it is consumed.

What I claim as new and desire to secure by Letters Patent of the United States is:

1. A non-isothermal voltaic cell comprising iodine electrodes in the gaseous state, a silver iodide electrolyte, inert electrodes in contact with the iodine electrodes and with said electrolyte, and passage means for permitting iodine to travel from the anode side of the cell to the cathode side of the cell.

2. A non-isothermal voltaic cell comprising an iodine anode and an iodine cathode both in the gaseous state, a silver iodide electrolyte, and passage means for permitting iodine to return from the anode to the cathode.

3. A non-isothermal voltaic cell comprising an annular crystalline silver iodide electrolyte surrounding a hollow insulating cylinder, said cylinder being coaxial with said electrolyte and extending through said electrolyte, a first foraminate annular inert metal electrode surrounding said cylinder and in contact with one side of said electrolyte, a second foraminate annular inert metal electrode surrounding said cylinder and in contact with the other side of said electrolyte, an annular gasket surrounding the periphery of said electrolyte, said gasket having a thickness less than the thickness of said electrolyte, each of said inert metal electrodes being cemented to said gasket, a first housing member joined to said first inert metal electrode adjacent said gasket, a second housing member joined to said second inert metal electrode adjacent to said gasket, said first housing member and said second housing member being electrically insulated from each other and defining a gas tight chamber, said gas tight chamber being filled with iodine.

References Cited in the file of this patent

C. A., vol. 32, page 3240[4].
Zeitschrift für Physikalische Chemie, A181, 169–82 (1937).